Feb. 18, 1958    D. W. GORRELL ET AL    2,823,934
COUPLING WITH CAM WASHER FOR FLAT DETENTS
Filed Nov. 2, 1953
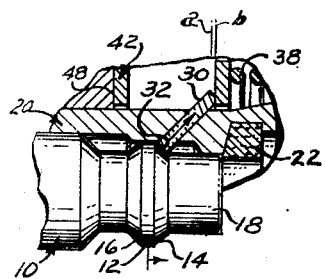
FIG. 3
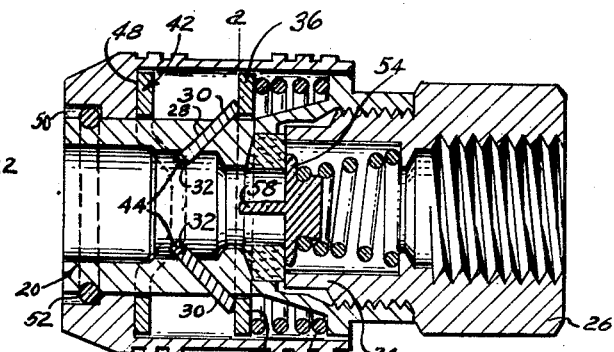
FIG. 1
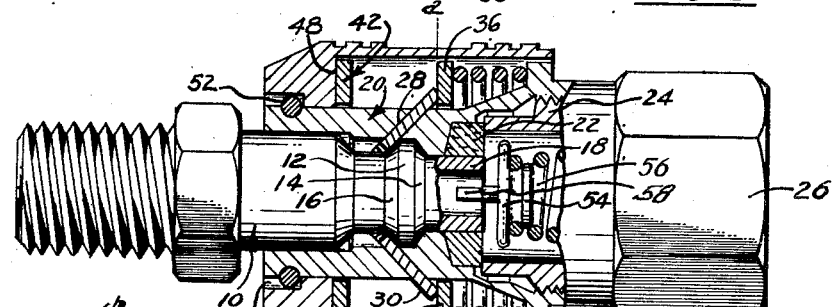
FIG. 2
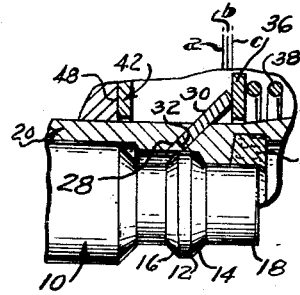
FIG. 4
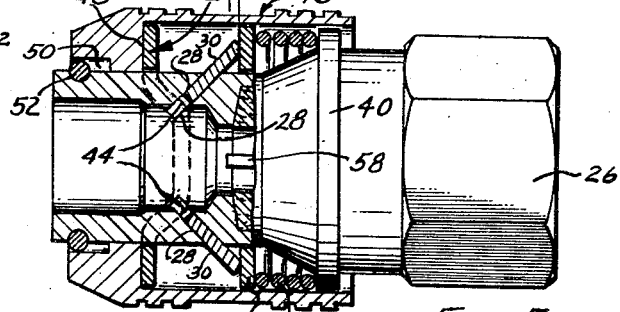
FIG. 5
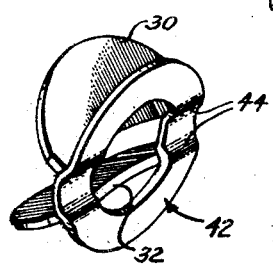
FIG. 7
FIG. 6
Inventors
DONALD W. GORRELL
ELWOOD F. KNAPP
By Bair, Freeman & Molinare
Attorneys

United States Patent Office 2,823,934
Patented Feb. 18, 1958

2,823,934

COUPLING WITH CAM WASHER FOR FLAT DETENTS

Donald W. Gorrell and Elwood F. Knapp, Bryan, Ohio, assignors to The Aro Equipment Corporation, Bryan, Ohio, a corporation of Ohio Application November 2, 1953, Serial No. 389,618

1 Claim. (Cl. 285—277)

This invention relates to a coupler for fluid lines which facilitates coupling and uncoupling a compressed air hose or the like relative to a device adapted to receive the compressed air, the coupler disclosed being comparatively simple and inexpensive to manufacture.

One object of the invention is to provide a quick fluid line coupler comprising a nipple fitting and a sleeve fitting which are cooperable by merely pushing the sleeve fitting onto the nipple fitting, and which includes an arrangement of locking jaws slidable in inclined slots and cooperable with a shoulder of the nipple fitting automatically to hold the two in coupled relation upon the insertion of the nipple fitting into the sleeve fitting.

Another object is to provide positive releasing means for the jaws in the form of a washer that surrounds the sleeve fitting and which is provided with a portion bent out of the plane thereof to produce inclined cam surfaces operable to cam the jaws outwardly in their slots incident to axial movement of the washer, a release sleeve being provided for actuating the washer and the jaws against the action of a spring constraining the jaws normally to the locked position.

A further object of the invention herein disclosed is to provide a coupling of the character referred to which will have minimum liability of the parts becoming accidentally uncoupled, yet which will readily permit uncoupling thereof when desired.

Still a further object is to provide a coupling member so constructed that it may be readily assembled with a minimum of labor and may likewise be readily disassembled for servicing and reassembly thereafter.

With these and other objects in view, our invention consists in the construction, arrangement and combination of the various parts of our coupler whereby the objects contemplated are obtained as hereinafter more fully set forth, pointed out in our claim and illustrated in the accompanying drawings wherein:

Fig. 1 is a sectional view through a coupler embodying our present invention, the parts being shown in the normal uncoupled position.

Fig. 2 is a similar sectional view showing the nipple in position and the coupler coupled thereto.

Fig. 3 is a sectional view similar to a portion of Fig. 1 showing the parts in the position they assume when being coupled.

Fig. 4 is a similar sectional view showing a further step in the coupling operation, which coupling operation has been completed in Fig. 2.

Fig. 5 is a sectional view similar to Fig. 1 showing the position of the parts during the uncoupling operation, the nipple shown in Fig. 2 being omitted from Fig. 5.

Fig. 6 is a face elevation of one of the locking jaws of our coupler; and

Fig. 7 is a perspective view of both of the locking jaws and the cam washer used to unlock them, their relative positions being illustrated.

On the accompanying drawing we have used the reference numeral 10 to indicate in general a nipple fitting.

The nipple fitting 10 has a shoulder 12 with inclined surfaces 14 and 16 and terminates in a reduced portion 18.

The nipple fitting 10 is adapted to be received in a coupling which consists of a sleeve 20 having a sealing washer 22 held therein by the threaded portion 24 of a hose connector fitting 26. The sleeve 20 is provided with inclined slots 28 diametrically opposite each other, the direction of inclination being inward and toward the reception end of the sleeve 20 with respect to the nipple fitting 10. Jaws 30 are received slidably in the slots 28 and one of these jaws is illustrated in Fig. 6. It is a metal element which might be considered as a section of a washer, being somewhat arcuate in shape with a pair of inner edges 33 slightly curved at 32 and a bevel at 34.

A flat washer 36 surrounds the sleeve 20 and engages against the beveled edges 34 of the jaws 30. A spring 38 is interposed between the washer 36 and a shoulder 40 of the sleeve 20. The spring 38 biases the washer 36 to the left in Fig. 1, thereby constraining the jaws 30 to move inwardly with respect to their slots 28, the normal position of the parts being as shown in this figure.

A second washer 42 surrounds the sleeve 20 and this washer instead of being the usual flat type is provided with a plurality of bends 44 which constitute cam surfaces in opposition to the inner edges 33 of the jaws 30. Means is provided for sliding this washer axially of the sleeve 20 in the form of a release or manipulating sleeve 46 having a shoulder 48 to engage the washer 42. A recess at 50 receives a snap ring 52 to hold the parts assembled.

Means is provided for normally sealing the coupling shown in Fig. 1 comprising a disc 54 backed by a spring 56. The disc 54 has a wing 58 thereon to be engaged by the nipple 10 as in Fig. 2 for forcing the disc 54 away from the sealing washer 22 when the parts are coupled together.

Practical operation

In the operation of our coupler, the uncoupled position of the jaws 30 as shown in Fig. 1 are the same as the coupled position shown in Fig. 2. During the coupling operation the nipple 10 is forced into the sleeve 20 as shown in Fig. 3 and the inclined surface 14 of the shoulder 12 engages the edges 33 of the jaws 30 for pushing them outwardly as indicated by the arrow appearing on the jaw and the left hand face of the washer 36 will be moved from the position indicated a in Figs. 3 and 4 to the position b.

Further inward movement of the nipple as in Fig. 4 will cause further movement of the jaw as to the position where the left hand face of the washer 36 is at c (the lines a and b being included in this Fig. 4 to show the relative positions of the parts).

After the shoulder 12 passes the jaws 30 they will be forced inwardly to the locking position of Fig. 2 by the action of the spring 38 and the washer 36 on the outer ends 34 of the jaws. The coupler is now connected to the nipple and cannot be accidentally uncoupled therefrom except by a releasing action which will now be described.

The releasing action is effected by moving the releasing sleeve 46 toward the right from the position shown in Fig. 2 and indicated a to the position shown in Fig. 5 and indicated c. This positively moves the jaws 30 outwardly in the slots 28 due to the bends or cam surfaces 44 in their axial movement engaging the surfaces 33 of the jaws 30 on each side of the nipple. In Fig. 5 the left hand surface of the washer 36 is indicated at c and may be compared to the line a in Fig. 2 to show the necessary movement for the releasing action.

From the foregoing specification it will be obvious that we have provided a comparatively simple construction utilizing but few parts for automatically coupling together a nipple and a sleeve member. The parts can be uncoupled quickly by manipulation of the sleeve 46 in the manner shown in Fig. 5 which positively moves the jaws 30 back to a position where they no longer engage the inclined surface 16 of the shoulder 12.

Some changes may be made in the construction and arrangement of the parts of our coupler without departing from the real spirit and purpose of our invention, and it is our intention to cover by our claim any modified forms of structure or use of mechanical improvements which may reasonably be included within their scope.

We claim as our invention:

A quick fluid line coupler comprising, in combination, a nipple fitting having a radially outwardly extending shoulder extending circumferentially therearound and defining therebehind a socket, a sleeve fitting adapted to receive said nipple fitting, a pair of spaced slots in said sleeve fitting inclined inwardly and toward the outer end thereof, an outwardly extending peripheral abutment shoulder on said sleeve fitting spaced from the outer end thereof a distance greater than the spacing of said slots from said outer end of the sleeve fitting, an actuating sleeve surrounding the portion of said sleeve fitting having slots therein and having the abutment shoulder thereon, said actuating sleeve being spaced from the slotted portion of the sleeve fitting to define an annular space therebetween, a pair of substantially flat jaws slidable in said slots and each having nipple-engaging portions thereof extending inwardly of said sleeve fitting, and forward and rearward control portions thereof extending outwardly of said sleeve into said annular space and located forwardly and rearwardly relative to the outer end of said sleeve fitting, a rearward control washer positioned in said annular space in engagement with the rearward control portions of said flat jaws, a forward control washer positioned in said annular space abutting said actuating sleeve and engaging the forward control portions of said flat jaws and having inclined shoulders bent out of the plane of the washer and engaging edges of said jaws to cam them outwardly in said slots when said forward control washer is moved axially by said actuating sleeve, a coil spring in said annular space between said rearward control washer and said peripheral abutment shoulder on said sleeve fitting operating through said rearward control washer to normally bias the jaws inwardly, said jaws being slidable outwardly against the bias of said spring upon engagement thereof with the shoulder on said nipple fitting as said nipple fitting enters the sleeve fitting and then being operative to move inwardly into the socket behind the shoulder to grip the nipple fitting within the sleeve fitting, and movement of the actuating sleeve against the bias of the spring operating through the forward control washer to selectively move the jaws outwardly to permit release of said nipple fitting from the sleeve fitting.

References Cited in the file of this patent

UNITED STATES PATENTS

| 1,209,572 | Fegley | Dec. 19, 1916 |
| 2,092,116 | Hansen | Sept. 7, 1937 |
| 2,344,740 | Shaff | Mar. 21, 1944 |
| 2,381,962 | Krone et al. | Aug. 14, 1945 |
| 2,433,119 | Hansen | Dec. 23, 1947 |